(12) United States Patent
Yamana

(10) Patent No.: US 10,393,995 B2
(45) Date of Patent: Aug. 27, 2019

(54) MIRROR DRIVING DEVICE

(71) Applicant: CANON KABUSHIKI KAISHA, Tokyo (JP)

(72) Inventor: Kazuaki Yamana, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 976 days.

(21) Appl. No.: 14/830,619

(22) Filed: Aug. 19, 2015

(65) Prior Publication Data
US 2016/0054542 A1    Feb. 25, 2016

(30) Foreign Application Priority Data

Aug. 22, 2014 (JP) .................................. 2014-169731
Aug. 22, 2014 (JP) .................................. 2014-169732

(51) Int. Cl.
*G02B 7/182* (2006.01)
*G03B 19/12* (2006.01)

(52) U.S. Cl.
CPC ........... *G02B 7/1821* (2013.01); *G03B 19/12* (2013.01); *G03B 2205/0053* (2013.01)

(58) Field of Classification Search
CPC .......... G02B 7/1821; G02B 2205/0053; G03B 19/12
USPC .................. 359/872, 874; 396/352, 358, 447
See application file for complete search history.

(56) References Cited

U.S. PATENT DOCUMENTS

| 4,864,336 | A  | * | 9/1989 | Fukahori | G03B 17/425 |
|           |    |   |        |          | 396/406 |
| 7,129,460 | B1 | * | 10/2006 | Olson | G02B 7/1827 |
|           |    |   |        |       | 250/208.1 |
| 8,734,030 | B2 | * | 5/2014 | Yamana | G03B 19/12 |
|           |    |   |        |        | 396/352 |
| 9,039,305 | B2 | * | 5/2015 | Yamana | G03B 19/12 |
|           |    |   |        |        | 396/358 |
| 9,063,395 | B2 | * | 6/2015 | Yamana | G03B 19/12 |
| 9,335,611 | B2 | * | 5/2016 | Yamana | G03B 19/12 |
| 9,891,408 | B2 | * | 2/2018 | Morita | G02B 7/1821 |
| 10,067,411 | B2 | * | 9/2018 | Imaizumi | G02B 26/0816 |

FOREIGN PATENT DOCUMENTS

| CN | 102540652 A | 7/2012 |
| CN | 102902140 A | 1/2013 |
| JP | 2008-175920 A | 7/2008 |

* cited by examiner

*Primary Examiner* — Ricky D Shafer
(74) *Attorney, Agent, or Firm* — Canon USA, Inc., IP Division

(57) ABSTRACT

A mirror driving device has a simple configuration and is capable of accelerating and decelerating a mirror during a mirror down operation. The mirror driving device includes a mirror, a mirror box attached to be movable between a first position where the mirror is located in an optical path and a second position where the mirror is retracted from the optical path, a mirror driving member rotatably attached to the mirror box and configured to drive the mirror, and a link member rotatably attached to the mirror driving member. A cam portion is formed in the mirror box. The link member includes a follower portion configured to follow with the cam portion.

6 Claims, 13 Drawing Sheets

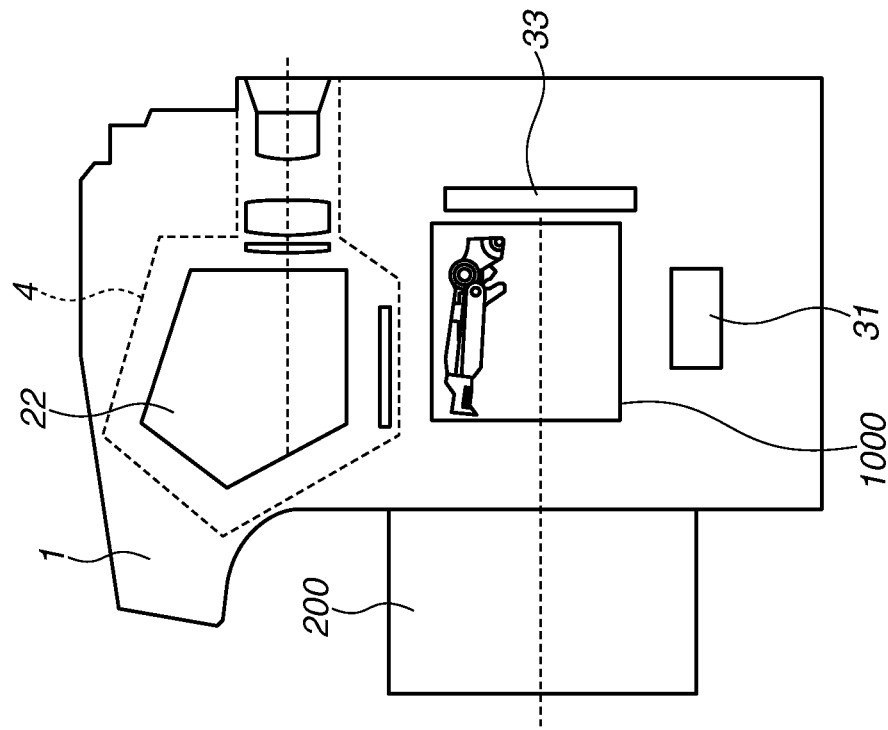
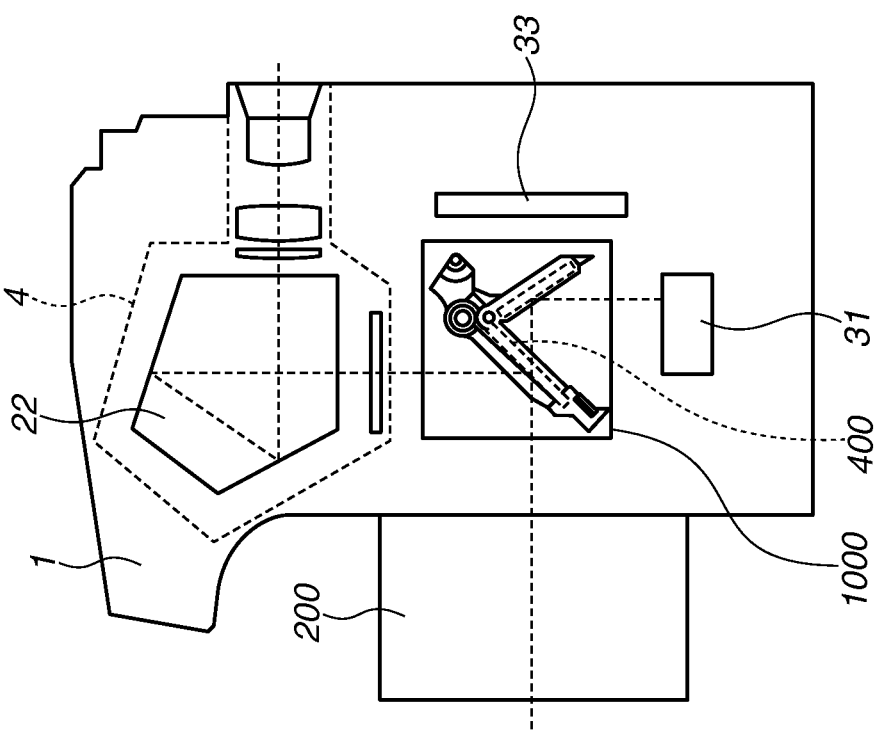

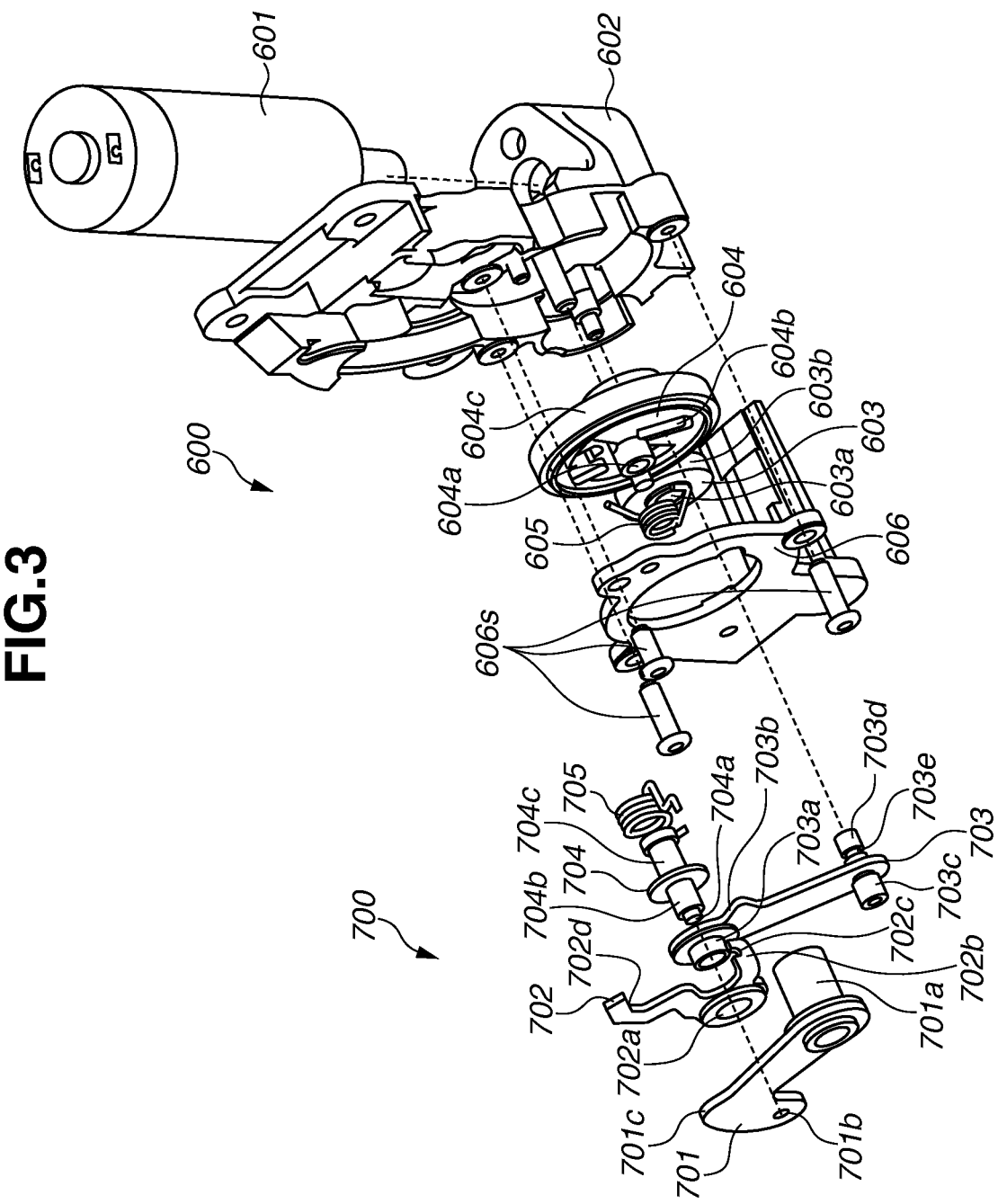

MIRROR DRIVING DEVICE

BACKGROUND OF THE INVENTION

Field of the Invention

The invention relates to a mirror driving device which includes a mechanism for driving a mirror at high speed.

Description of the Related Art

A conventional quick-return mirror mechanism of a single-lens reflex camera moves a main mirror and a sub mirror into and out of an optical path from an imaging optical system (imaging optical path) at high speed. Japanese Patent Application Laid-Open No. 2008-175920 discusses bringing the mirrors into contact with stoppers arranged in a mirror box to position the mirrors at predetermined stop positions in the imaging optical path, thereby guiding light to a viewfinder optical system and a focus detection unit.

SUMMARY OF THE INVENTION

According to an aspect of the invention, a mirror driving device includes a mirror, a mirror box attached to be movable between a first position where the mirror is located in an optical path and a second position where the mirror is retracted from the optical path, a mirror driving member rotatably attached to the mirror box and configured to drive the mirror, and a link member rotatably attached to the mirror driving member, wherein a cam portion is formed in the mirror box, and wherein the link member includes a follower portion configured to follow with the cam portion.

Further features of the invention will become apparent from the following description of exemplary embodiments with reference to the attached drawings.

BRIEF DESCRIPTION OF THE DRAWINGS

FIGS. 1A and 1B are diagrams illustrating a configuration of a digital single-lens reflex camera that implements the invention.

FIG. 3 is an exploded perspective view of a mirror charge unit and a mirror driving lever unit.

FIGS. 10A, 10B, 100, and 10D are diagrams illustrating a state of various portions when the mirror unit is at a mirror up position.

DESCRIPTION OF THE EMBODIMENTS

FIGS. 1A and 1B are diagrams illustrating a configuration of a digital single-lens reflex camera which is an example of an imaging apparatus including a mirror driving device that implements the invention.

Figure 2:
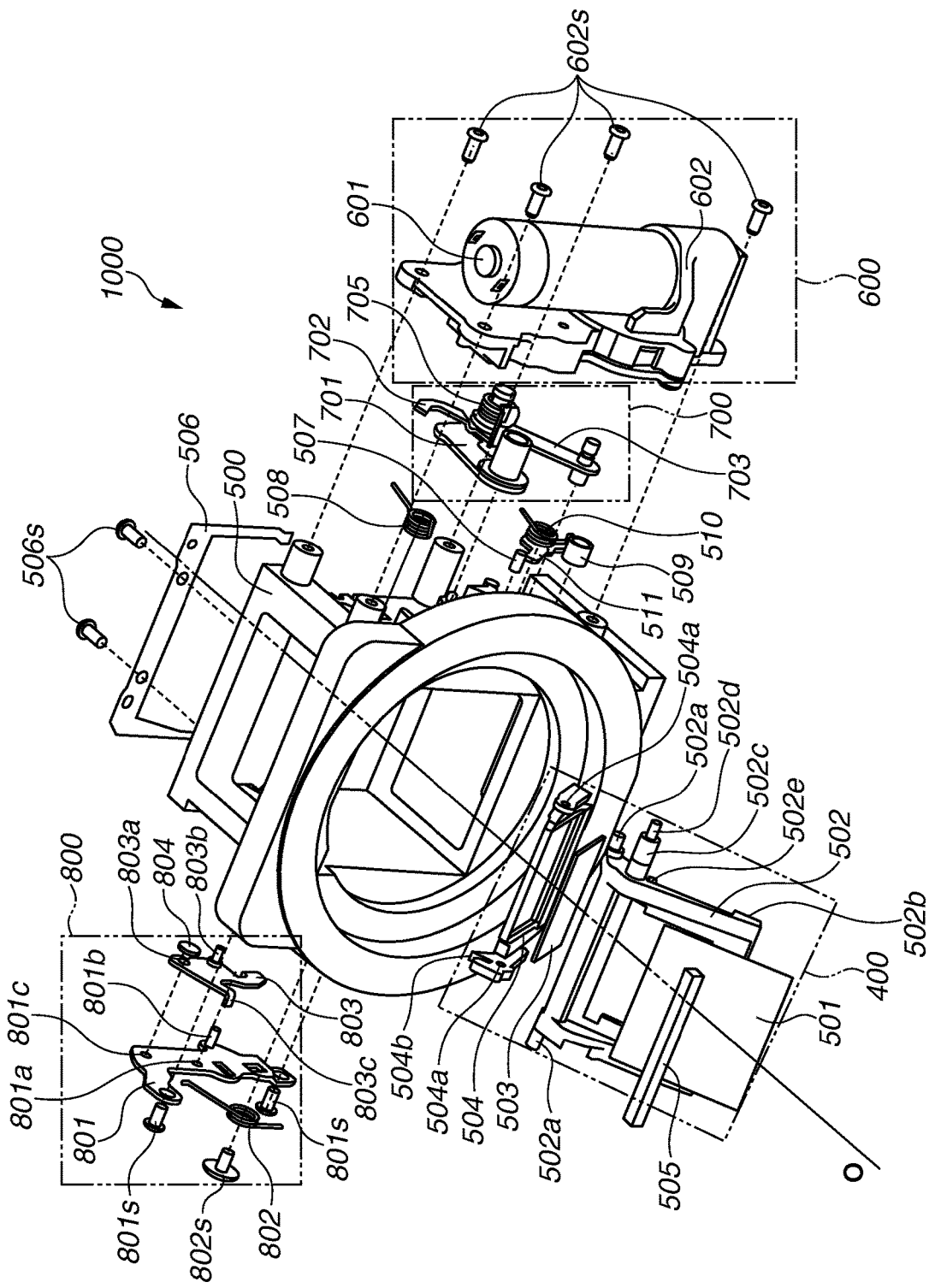
FIG. 2 is an exploded perspective view illustrating a configuration of a mirror driving unit.

In FIGS. 1A and 1B, an interchangeable lens 200 is mounted on a camera main body 1. The camera main body 1 includes a focus detection unit 31, an optical viewfinder unit 4, a mirror driving unit 1000, and an image sensor 33. The mirror driving unit 1000 drives a mirror unit 400 between a mirror down position (first position) and a mirror up position (second position). As illustrated in FIG. 2, The mirror unit 400 includes a main mirror holder 502 which holds a main mirror 501, and a sub mirror holder 504 which holds a sub mirror 503. The main mirror holder 502 is rotatably attached to a mirror box 500. The sub mirror holder 504 is rotatably attached to the main mirror holder 502.

FIG. 1A illustrates a state where the mirror unit 400 is located in an optical path. A light beam passed through the interchangeable lens 200 is split by the main mirror 501. A light beam reflected by the main mirror 501 is guided to a pentaprism 22 of the optical viewfinder unit 4. Meanwhile, a light beam transmitted through the main mirror 501 is reflected by the sub mirror 503 and guided to the focus detection unit 31. In the state of FIG. 1A, the light beam passed through the interchangeable lens 200 is therefore not guided to the image sensor 33. When in the state illustrated in FIG. 1A, the main mirror holder 502 and the sub mirror holder 504 are located at a mirror down position.

FIG. 1B illustrates a state where the mirror unit 400 is retracted from the optical path. More specifically, the main mirror holder 502 is retracted from the state of FIG. 1A to go upward in the mirror box 500. Here, the sub mirror holder 504 is also retracted to go upward in the mirror box 500 in an overlapping manner with the main mirror holder 502. In the state of FIG. 1B, the light beam passed through the interchangeable lens 200 is not guided to the optical viewfinder unit 4 or the focus detection unit 31 but to the image sensor 33. When in the state illustrated in FIG. 1B, the main mirror holder 502 and the sub mirror holder 504 are located at a mirror up position.

As illustrated in FIGS. 1A and 1B, the mirror driving unit 1000 can drive the main mirror holder 502 and the sub mirror holder 504 between the mirror down position and the mirror up position.

FIG. 2 is an exploded perspective view illustrating a configuration of the mirror driving unit 1000. In FIG. 2, a center O indicates the center of a light beam incident on the camera main body 1.

As illustrated in FIG. 2, the mirror driving unit 1000 includes the mirror unit 400, the mirror box 500, a mirror charge unit 600, a mirror driving lever unit 700, and a sub mirror driving unit 800.

The mirror unit 400 includes the main mirror holder 502 which holds the main mirror 501, and the sub mirror holder 504 which holds the sub mirror 503.

The main mirror 501 is held by the main mirror holder 502. The main mirror holder 502 includes a rotation shaft 502a. The rotation shaft 502a is pivotally supported by the mirror box 500. The main mirror holder 502 is attached to the mirror box 500 so as to rotate about the rotation shaft 502a. A contact surface 502b is formed on the main mirror holder 502. When the main mirror holder 502 reaches the mirror down position, the contact surface 502b makes contact with a main mirror positioning shaft 507.

A first shaft portion 502c is formed on the main mirror holder 502. A mirror driving cam 701c (FIG. 3) of a mirror driving lever 701 makes contact with the first shaft portion 502c. A second shaft portion 502d is formed on the main mirror holder 502. When the main mirror holder 502 is at the mirror up position, an engagement cam portion 702d (FIG. 3) of a mirror down lever 702 is engaged with the second shaft portion 502d. The engagement cam portion 702d of the mirror down lever 702 functions as an engagement portion to be engaged with a mirror.

A contact portion 502e is formed on the main mirror holder 502. When the main mirror holder 502 moves from the mirror up position to the mirror down position, and before the main mirror holder 502 reaches the mirror down position, the contact portion 502e makes contact with a contact portion 504d (FIG. 7D) of the sub mirror holder 504. When the main mirror holder 502 reaches the mirror down position, the contact between the contact portions 502e and 504d is released.

The sub mirror 503 is held by the sub mirror holder 504. Hole portions 504a are formed in the sub mirror holder 504. A shaft 502f (FIG. 7D) of the main mirror holder 502 is engaged with the hole portions 504a of the sub mirror holder 504, and the sub mirror holder 504 is pivotally supported by the shaft 502f of the main mirror holder 502. The sub mirror holder 504 rotates about the shaft 502f of the main mirror holder 502. A driving cam 504b is formed on the sub mirror holder 504. A sub mirror driving shaft 803b formed on a sub mirror driving lever 803 is engaged with the driving cam 504b. A contact surface 504c (FIG. 7D) is formed on the sub mirror holder 504. When the sub mirror holder 504 reaches the mirror down position, the contact surface 504c makes contact with a sub mirror positioning shaft 801b. The contact portion 504d is formed on the sub mirror holder 504. When the sub mirror holder 504 moves from the mirror up position to the mirror down position, and before the sub mirror holder 504 reaches the mirror down position, the contact portion 504d makes contact with the contact portion 502e of the main mirror holder 502. When the sub mirror holder 504 reaches the mirror down position, the contact between the contact portions 504d and 502e is released.

As illustrated in FIG. 2, a mirror up stopper 505 is attached to the mirror box 500. When the main mirror holder 502 reaches the mirror up position, the mirror up stopper 505 collides with a leading end of the main mirror holder 502. The mirror up stopper 505 is made of an elastic member that can absorb impact. The mirror up stopper 505 can absorb the impact of the collision with the leading end of the main mirror holder 502.

As illustrated in FIG. 2, a shaft retainer plate 506 is attached to the back surface of the mirror box 500. After the main mirror holder 502 is attached to the mirror box 500, the shaft retainer plate 506 is fixed to the mirror box 500 by screws 506s so as to retain the rotation shaft 502a of the main mirror holder 502. In such a manner, the main mirror holder 502 is rotatably attached to the mirror box 500.

As illustrated in FIG. 2, the main mirror positioning shaft 507 is attached to one side surface of the mirror box 500.

The main mirror positioning shaft 507 is made of an eccentric pin. The mirror down position of the main mirror holder 502 can be adjusted by rotating the main mirror positioning shaft 507.

As illustrated in FIG. 2, a main mirror down spring 508 is attached to the one side surface of the mirror box 500. The main mirror down spring 508 biases the first shaft portion 502c of the main mirror holder 502 so that the main mirror holder 502 approaches the mirror down position.

As illustrated in FIG. 2, the mirror charge unit 600 is attached on the one side surface of the mirror box 500. The mirror charge unit 600 includes a motor 601 and a gear base 602. The motor 601 is supported by the gear base 602. The gear base 602 is attached to the one side surface of the mirror box 500 by screws 602s.

Figure 5A:
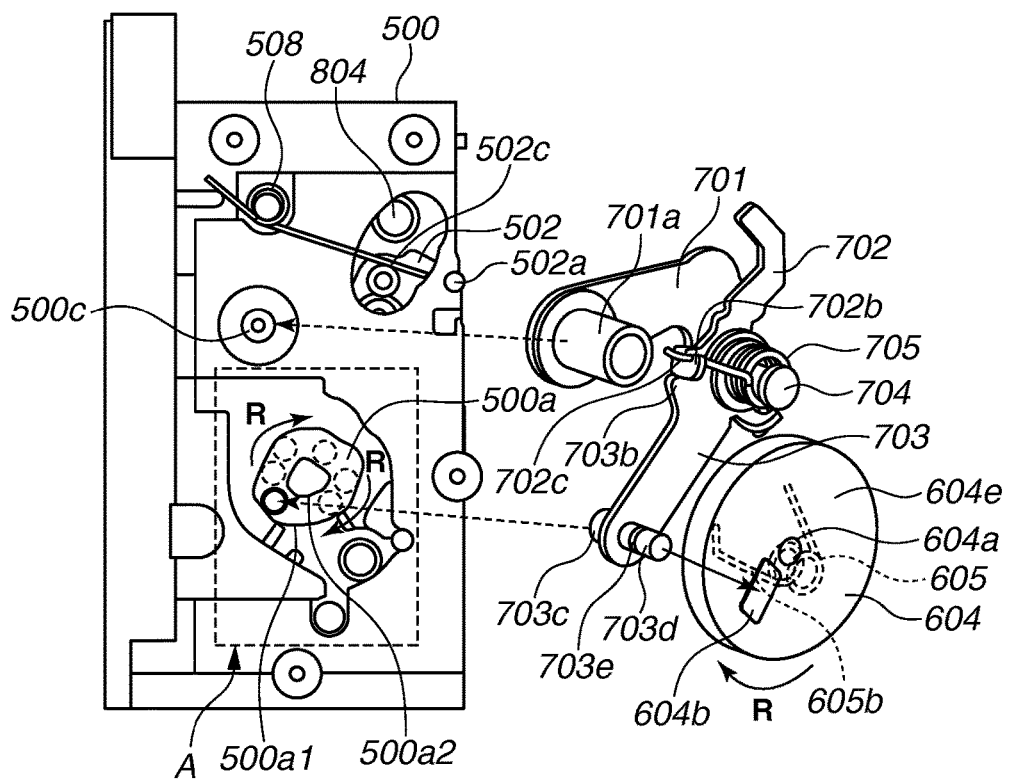
FIGS. 5A, 5B, and 5C are diagrams illustrating an engagement state between a mirror box and the mirror driving lever unit and an engagement state between the mirror driving lever unit and a rotation plate.

A looped groove cam portion 500a is formed in the one side surface of the mirror box 500. As illustrated in FIG. 5A, the groove cam portion 500a has an outer cam surface 500a1 and an inner cam surface 500a2. The groove cam portion 500a functions as a cam portion formed in the mirror box 500.

FIG. 3 is an exploded perspective view of the mirror charge unit 600 and the mirror driving lever unit 700. A gear 603 and a rotation plate 604 are attached to the gear base 602. The gear 603 is pivotally supported by the gear base 602 at a rotation center 603a. The rotation plate 604 is pivotally supported by the gear base 602 at a rotation center 604a. The gear 603 and the rotation plate 604 are rotatably attached to the gear base 602. If the gear 603 and the rotation plate 604 are attached to the gear base 602, a gear portion 603b formed on an outer peripheral surface of the gear 603 and a gear portion 604c formed on an outer peripheral surface of the rotation plate 604 mesh with each other. Driving force of the motor 601 is transmitted to the gear 603. As a result, the driving force of the motor 601 is transmitted to the rotation plate 604 via the gear 603. The rotation plate 604 functions as a rotation member to be driven to rotate by the motor 601 serving as a driving source.

Figure 5B:
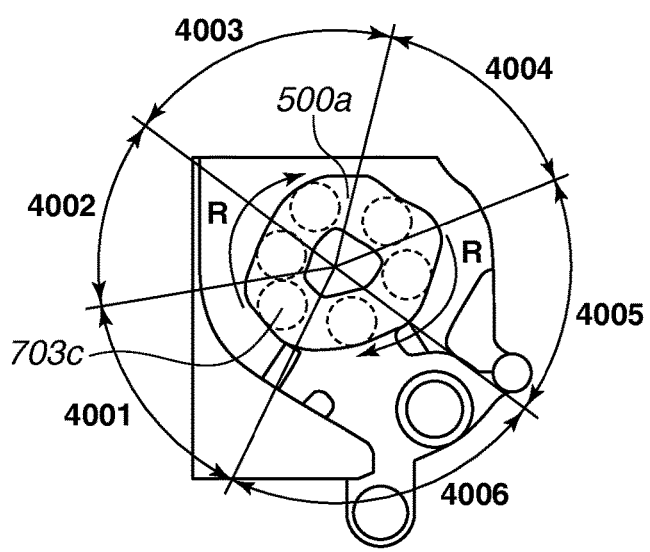
Figure 5C:
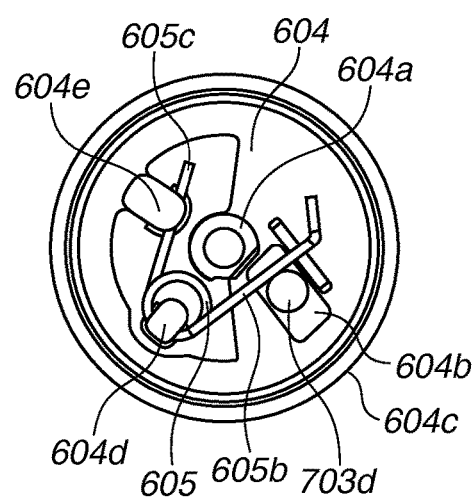

As illustrated in FIG. 5C, The rotation plate 604 includes a long hole 604b and latch portions 604d and 604e. A rotation spring 605 is attached to the rotation plate 604. A coil portion of the rotation spring 605 is latched on the latch portion 604d. A fixed end 605c of the rotation spring 605 is latched on the latch portion 604e. The rotation spring 605 functions as a biasing member.

As illustrated in FIG. 3, after the gear 603 and the rotation plate 604 are attached to the bear base 602, a cover 606 is attached to the gear base 602. The cover 606 is fixed to the gear base 602 by screws 606s.

As illustrated in FIG. 2, the mirror driving lever unit 700 is attached to the one side surface of the mirror box 500. The mirror driving lever unit 700 includes the mirror driving lever 701, the mirror down lever 702, a link lever 703, a rotation shaft 704 (FIG. 3), and a mirror down lever return spring 705. As illustrated in FIG. 3, the mirror driving lever 701 includes a cylindrical portion 701a, a coupling hole 701b, and the mirror driving cam 701c. A shaft portion 500c (FIG. 5A) formed on the one side surface of the mirror box 500 is inserted into the cylindrical portion 701a. The mirror driving lever 701 is attached to the mirror box 500 so as to rotate about the shaft portion 500c. The mirror driving lever 701 functions as a mirror driving member rotatably attached to the mirror box 500 and configured to drive the mirror unit 400.

As illustrated in FIG. 3, the mirror down lever 702 includes a hole portion 702a, a contact portion 702b, a latch groove 702c, and the engagement cam portion 702d. The latch groove 702c is formed in the contact portion 702b.

As illustrated in FIG. 3, the link lever 703 includes a cylindrical portion 703a, a contact portion 703b, a follower portion 703c, a driving shaft portion 703d, and a latch groove portion 703e. As illustrated in FIG. 3, the cylindrical portion 703a is formed to protrude toward the mirror down lever 702. The cylindrical portion 703a is inserted into the hole portion 702a of the mirror down lever 702. As illustrated in FIG. 3, the follower portion 703c is formed on a surface of the link lever 703 that faces the mirror box 500. If the mirror driving lever unit 700 is attached to the one side surface of the mirror box 500, the follower portion 703c follows with the outer cam surface 500a1 or the inner cam surface 500a2 of the groove cam portion 500a. The link lever 703 function as a link member which is rotatably attached to the mirror driving member and includes a follower portion that follows with the cam portion.

As illustrated in FIG. 3, the driving shaft portion 703d is formed on a surface of the link lever 703 that is opposite to the surface on which the follower portion 703c is formed. The latch groove portion 703e is formed in the foot of the driving shaft portion 703d.

As illustrated in FIG. 3, the rotation shaft 704 includes a small-diameter portion 704a, a large-diameter portion 704b, and a spring holding portion 704c. The large-diameter portion 704b of the rotation shaft 704 is inserted into the cylindrical portion 703a of the link lever 703. The small-diameter portion 704a of the rotation shaft 704 is inserted into the coupling hole 701b. The cylindrical portion 703a of the link lever 703 is inserted into the hole portion 702a of the mirror down lever 702. As a result, the mirror driving lever 701 and the link lever 703 are coupled so that the mirror driving lever 701 rotates with respect to the link lever 703.

As illustrated in FIG. 3, a coil portion of the mirror down lever return spring 705 is held by the spring holding portion 704c of the rotation shaft 704. A fixed end of the mirror down lever return spring 705 is latched on the link lever 703. A movable end of the mirror down lever return spring 705 is latched in the latch groove 702c of the mirror down lever 702. The mirror down lever return spring 705 biases the mirror down lever 702 so that the contact portion 702b of the mirror down lever 702 makes contact with the contact portion 703b of the link lever 703.

If the mirror driving lever unit 700 and the mirror charge unit 600 are attached to the one side surface of the mirror box 500, the driving shaft portion 703d is inserted into the long hole 604b formed in the rotation plate 604. In addition, a movable end of the rotation spring 605 is latched in the latch groove portion 703e of the link lever 703. As a result, the driving shaft portion 703d is biased, inside the long hole 604b, by the rotation spring 605 in a direction away from the rotation center 604a of the rotation center 604.

Figure 7A:
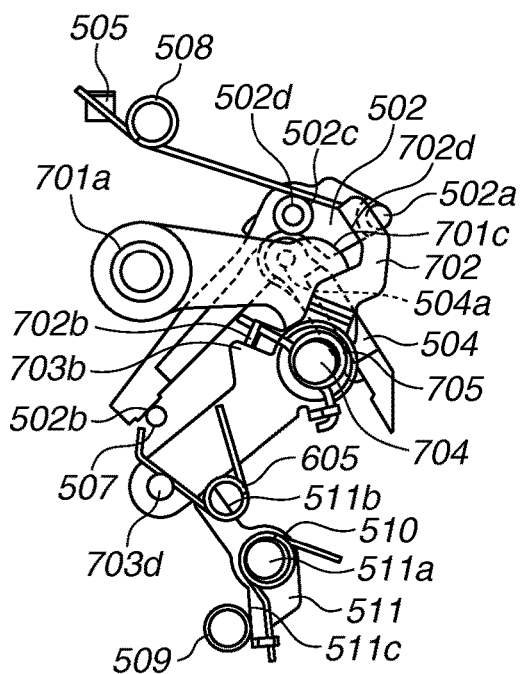
FIGS. 7A, 7B, 7C, and 7D are diagrams illustrating a state of various portions when a mirror unit is at a mirror down position.

As illustrated in FIG. 2, a deceleration lever 511 and a deceleration lever return spring 510 are attached to the one side surface of the mirror box 500. The deceleration lever 511 includes a rotation shaft portion 511a (FIG. 7A), and contact portions 511b (FIG. 7A) and 511c (FIG. 7A).

The deceleration lever 511 is attached to the mirror box 500 so as to rotate about the rotation shaft portion 511a. A coil portion of the deceleration lever return spring 510 is arranged on the rotation shaft portion 511a. A fixed end of the deceleration lever return spring 510 is latched on the mirror box 500. A movable end of the deceleration lever return spring 510 is latched on the deceleration lever 511. Biasing force of the deceleration lever return spring 510 brings the contact portion 511c of the deceleration lever 511 into contact with a deceleration lever stopper 509. The deceleration lever 511 is attached to the mirror box 500 so that the contact portion 511b of the deceleration lever 511 enters the groove cam portion 500a. The deceleration lever 511 functions as a deceleration member which is attached to be shiftable between an entry state of entering a movement trajectory of the follower portion 703c and a retracted state of being retracted from the movement trajectory of the follower portion 703c.

As illustrated in FIG. 2, the sub mirror driving unit 800 is attached to the other side surface of the mirror box 500. The sub mirror driving unit 800 includes a sub mirror positioning plate 801, a sub mirror biasing spring 802, the sub mirror driving lever 803, and a rotation shaft 804. The sub mirror positioning plate 801 includes a hole portion 801a, the sub mirror positioning shaft 801b, and a hole portion 801c. The sub mirror positioning plate 801 is attached to the mirror box 500 so as to rotate about the hole portion 801a. The sub mirror positioning plate 801 is rotated about the hole portion 801a to adjust a position of the sub mirror positioning shaft 801b. After the adjustment of the position of the sub mirror positioning shaft 801b, the sub mirror positioning plate 801 is fixed to the mirror box 500 by screws 801b. The sub mirror driving lever 803 includes a hole portion 803a, the sub mirror driving shaft 803b, and a latch portion 803c. The rotation shaft 804 is inserted into the hole portion 803a and fitted into the hole portion 801c of the sub mirror positioning plate 801. As a result, the sub mirror driving lever 803 is attached to the sub mirror positioning plate 801 so as to rotate about the rotation shaft 804. A coil portion of the sub mirror biasing spring 802 is fixed to the other side surface of the mirror box 500 by a screw 802s. A fixed end of the sub mirror biasing spring 802 is latched on the mirror box 500. A movable end of the sub mirror biasing spring 802 is latched on the latch portion 803c.

Figure 4C:
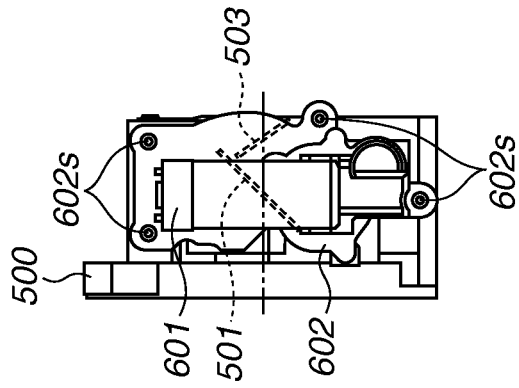
FIGS. 4A, 4B, and 4C are diagrams illustrating the mirror driving unit in a completed state.
Figure 4B:
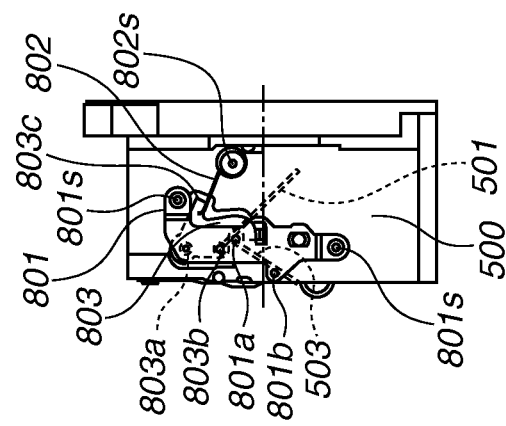
Figure 4A:
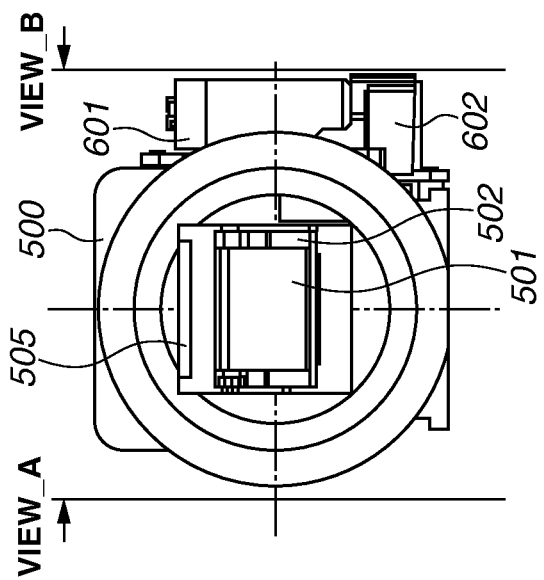

FIGS. 4A, 4B, and 4C are diagrams illustrating the mirror driving unit 1000 in a completed state. FIG. 4A is a front view of the mirror driving unit 1000. FIG. 4B is a view of the mirror driving unit 1000 as seen from VIEW_A in FIG. 4A (from the other side surface of the mirror box 500). FIG. 4C is a view of the mirror driving unit 1000 as seen from VIEW_B in FIG. 4A (from the one side surface of the mirror box 500).

As illustrated in FIG. 4B, the sub mirror driving lever 803 is biased by the sub mirror biasing spring 802 counterclockwise in FIG. 4B.

As illustrated in FIG. 4C, the mirror driving lever unit 700 is attached to the one side surface of the mirror box 500. As illustrated in FIG. 3, The mirror charge unit 600 is attached so as to cover the mirror driving lever unit 700.

FIGS. 5A, 5B, and 5C are diagrams illustrating a relationship between the groove cam portion 500a formed in the mirror box 500 and the follower portion 703c of the link lever 703, and a relationship between the rotation plate 604 and the driving shaft portion 703d of the link lever 703. FIG. 5A is a diagram illustrating an engagement state between the mirror box 500, the mirror driving lever unit 700, and the rotation plate 604. FIG. 5B is an enlarged diagram of a portion A in FIG. 5A, and is a diagram illustrating a following relationship between the groove cam portion 500a formed in the mirror box 500 and the follower portion 703c of the link lever 703. FIG. 5C is a diagram illustrating an engagement relationship between the rotation plate 604 and the driving shaft portion 703d of the link lever 703.

As illustrated in FIG. 5A, the shaft portion 500c is formed on the one side surface of the mirror box 500. The cylindrical portion 701a of the mirror driving lever 701 is arranged to the shaft portion 500c so that the shaft portion 500c is held therein, whereby the mirror driving lever unit 700 is attached to the mirror box 500. Here, the follower portion 703c of the link lever 703 is engaged with the groove cam portion 500a. In addition, the driving shaft portion 703d of the link lever 703 is engaged with the long hole 604b of the rotation plate 604. A movable end 605b of the rotation spring 605 is latched in the latch groove portion 703e of the link lever 703. If the rotation plate 604 is driven to rotate by the motor 601, the follower portion 703c follows with the groove cam portion 500a to move in a direction indicated by arrows R in FIGS. 5A and 5B. In FIG. 5A, the follower portion 703c illustrated by a solid line indicates the position of the follower portion 703c when the mirror unit 400 is at the mirror down position.

As illustrated in FIG. 5A, if the rotation plate 604 is driven by the motor 601 to rotate in the direction indicated by the arrows R, the follower portion 703c follows with the outer cam surface 500a1 or the inner cam surface 500a2 of the groove cam portion 500a.

As illustrated in FIG. 5C, the coil portion of the rotation spring 605 is latched on the latch portion 604d. The fixed end 605c of the rotation spring 605 is latched on the latch portion 604e. The movable end 605b of the rotation spring 605 is latched in the latch groove portion 703e formed in the driving shaft portion 703d of the link lever 703. Even if the rotation plate 604 is driven to rotate, the rotation spring 605 constantly biases the driving shaft portion 703d outward. Since the driving shaft portion 703d of the link lever 703 is constantly biased outward by the biasing force of the rotation spring 605, as illustrated in FIG. 5B, the follower portion 703c follows with the outer cam surface 500a1 of the groove cam portion 500a except for some sections.

If the rotation plate 604 makes one rotation in the direction indicated by the arrows R from the state where the mirror unit 400 is at the mirror down position, the follower portion 703c follows with the groove cam portion 500a from sections 4001 through 4006 as illustrated in FIG. 5B.

A conductive contact element is arranged on the latch portion 604e of the rotation plate 604. A conductive pattern for the conductive contact element to follow with is arranged on the gear base 602. The following of the conductive contact element with the conductive pattern enables detection of a rotational phase of the rotation plate 604. Based on the detected rotational phase of the rotation plate 604, the mirror driving unit 1000 according to the present exemplary embodiment detects which of the sections 4001 to 4006 the follower portion 703c is in. According to the detection result, the motor 601 can be controlled to start up, stop, accelerate, and decelerate.

In FIG. 5B, the section 4001 is a section where the mirror unit 400 is at rest at the mirror down position. In this section, the motor 601 is controlled to stop. The section 4002 is a section where the mirror unit 400 moves from the mirror down position to the mirror up position. In this section, the motor 601 is controlled to accelerate. The section 4002 is an acceleration section in which a moving speed of the mirror unit 400 is increased.

The section 4003 is a section immediately before the mirror unit 400 ends a mirror up operation. In this section, the motor 601 is controlled to decelerate. The section 4003 is a deceleration section in which the moving speed of the mirror unit 400 is decreased.

In FIG. 5B, the section 4004 is a section where the mirror unit 400 is at rest at the mirror up position. In this section, the motor 601 is controlled to stop. The section 4005 is a section where the mirror unit 400 moves from the mirror up position to the mirror down position. In this section, the motor 601 is controlled to accelerate. The section 4005 is an acceleration section in which the moving speed of the mirror unit 400 is increased.

The section 4006 is a section immediately before the mirror unit 400 ends a mirror down operation. In this section, the motor 601 is controlled to decelerate. The section 4006 is a deceleration section in which the moving speed of the mirror unit 400 is decreased.

Figure 6:
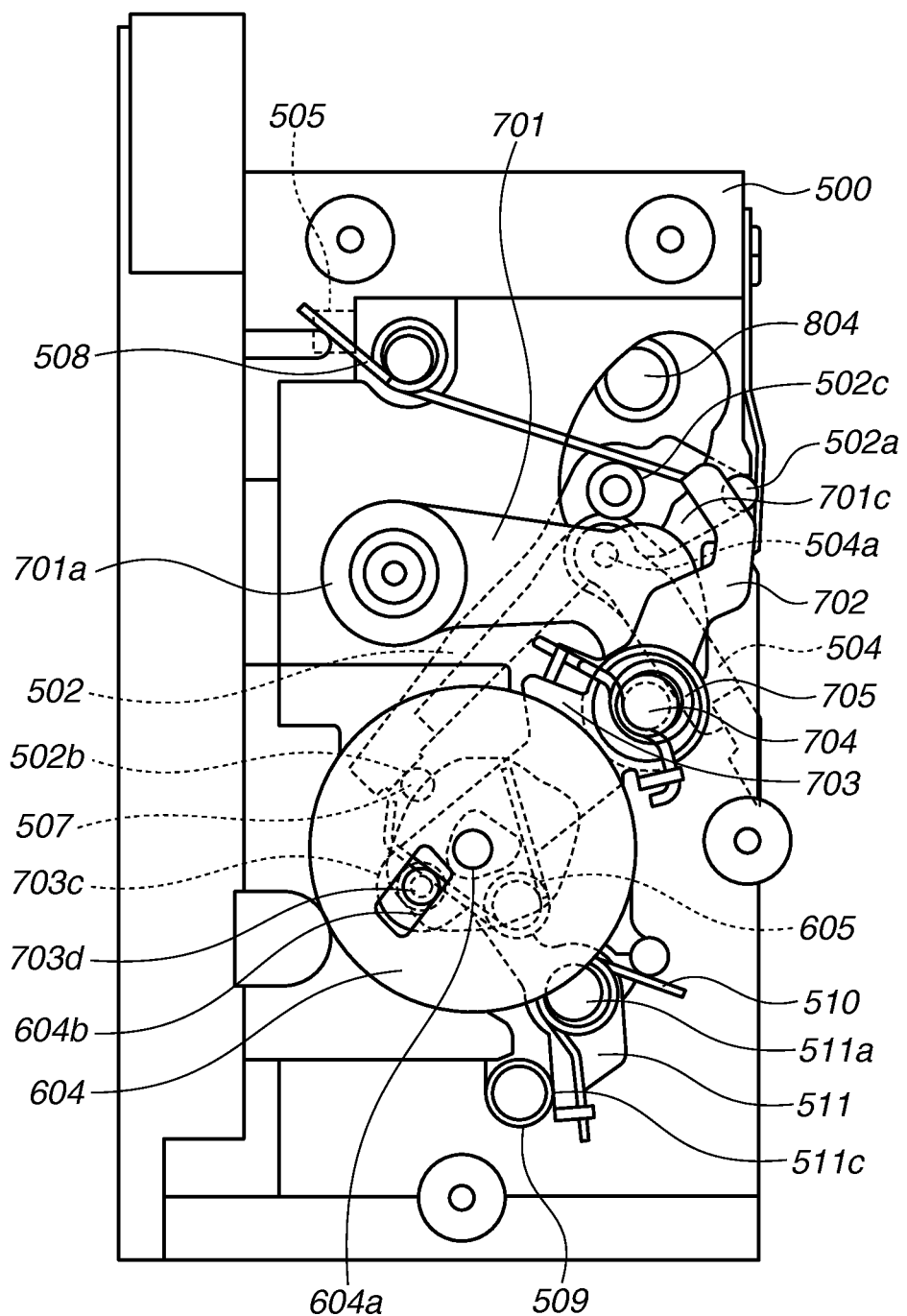
FIG. 6 is a view of one side surface of the mirror box from which a motor, a gear base, a gear, and a cover are omitted.

FIG. 6 is a view of the one side surface of the mirror box 500 illustrated in FIG. 4C, from which the motor 601, the gear base 602, the gear 603, and the cover 606 are omitted.

As illustrated in FIG. 6, the mirror driving lever unit 700 (FIG. 3), the deceleration lever 511, the deceleration lever return spring 510, the main mirror down spring 508, and the rotation plate 604 are arranged on the one side surface of the mirror box 500. The rotation plate 604 is pivotally supported by the gear base 602 and arranged in the position of FIG. 6 with its axial movement being regulated by the cover 606.

In the state illustrated in FIG. 6, the mirror unit 400 is at the mirror down position.

The mirror up operation and the mirror down operation of the mirror driving unit 1000 according to the present exemplary embodiment will be described below with reference to FIGS. 7A to 13D.

Figure 7B:
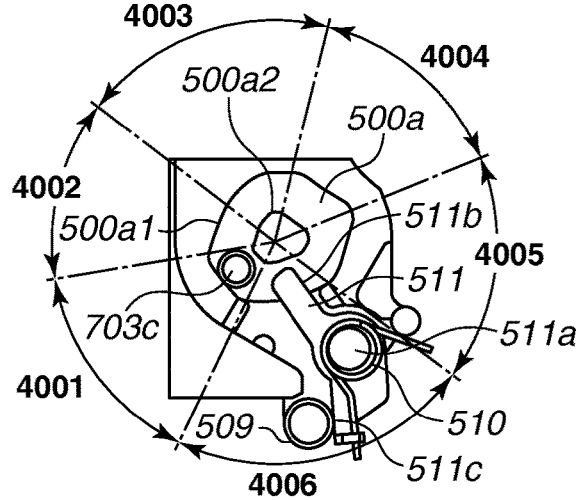
Figure 7C:
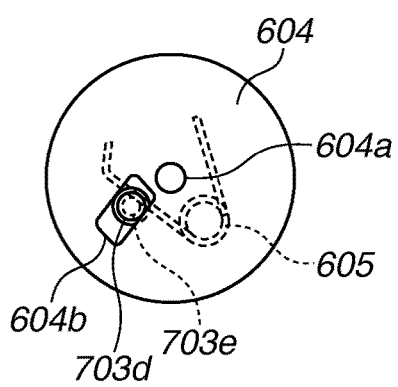
Figure 7D:
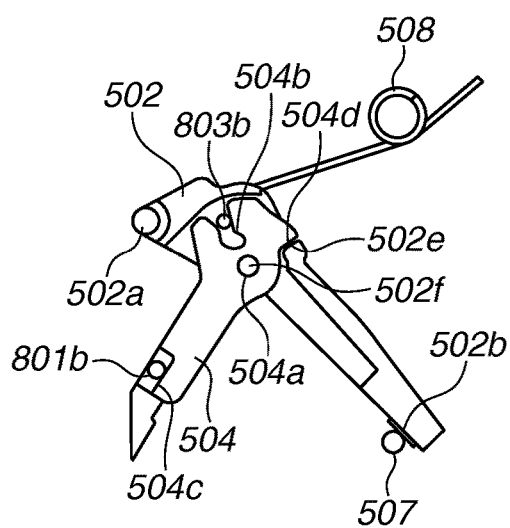

FIGS. 7A to 7D are diagrams illustrating a state of various portions when the mirror unit 400 is at the mirror down position. FIG. 7A is a diagram illustrating a state of various parts arranged on the one side surface of the mirror box 500 when the mirror unit 400 is at the mirror down position. FIG. 7A is the view of the one side surface of the mirror box 500 illustrated in FIG. 6 from which the mirror box 500 is omitted. FIG. 7B is a diagram illustrating a following relationship between the groove cam portion 500a formed in the mirror box 500 and the follower portion 703c of the link lever 703 when the mirror unit 400 is at the mirror down position. FIG. 7C is a diagram illustrating an engagement relationship between the rotation plate 604 and the driving shaft portion 703d of the link lever 703 when the mirror unit 400 is at the mirror down position. FIG. 7D is a diagram illustrating a state of the main mirror holder 502 and the sub mirror holder 504 when the mirror unit 400 is at the mirror down position.

As illustrated in FIG. 7A, in such a state, the contact surface 502b of the main mirror holder 502 is in contact with the main mirror positioning shaft 507 by the force of the main mirror down spring 508 that biases the first shaft portion 502c of the main mirror holder 502. In such a state, the mirror driving cam 701c of the mirror driving lever 701 is not in contact with the first shaft portion 502c. Here, the engagement cam portion 702d of the mirror down lever 702 is not engaged with the second shaft portion 502d of the main mirror holder 502. The contact portion 702b of the mirror down lever 702 and the contact portion 703b of the link lever 703 are brought into contact with each other by the biasing force of the mirror down lever return spring 705.

As illustrated in FIG. 7B, in such a state, the follower portion 703c of the link lever 703 is located in the section 4001, and the motor 601 is controlled to stop. As illustrated in FIG. 7C, the driving shaft portion 703d of the link lever 703 is biased outward by the biasing force of the rotation spring 605. The follower portion 703c of the link lever 703 is thus in contact with the outer cam surface 500a1 of the groove cam portion 500a.

As illustrated in FIG. 7D, in such a state, the contact surface 502b of the main mirror holder 502 is in contact with the main mirror positioning shaft 507. The contact surface 504c of the sub mirror holder 504 is in contact with the sub mirror positioning shaft 801b. Here, the contact portion 502e of the main mirror holder 502 and the contact portion 504d of the sub mirror holder 504 are not in contact with each other. There is a gap formed between the contact portions 502e and 504d.

If the motor 601 is started up in the state illustrated in FIGS. 7A, 7B, 7C, and 7D and the mirror driving unit 1000 starts the mirror up operation, the state illustrated in FIGS. 8A, 8B, 8C, and 8D is caused.

Figure 8A:
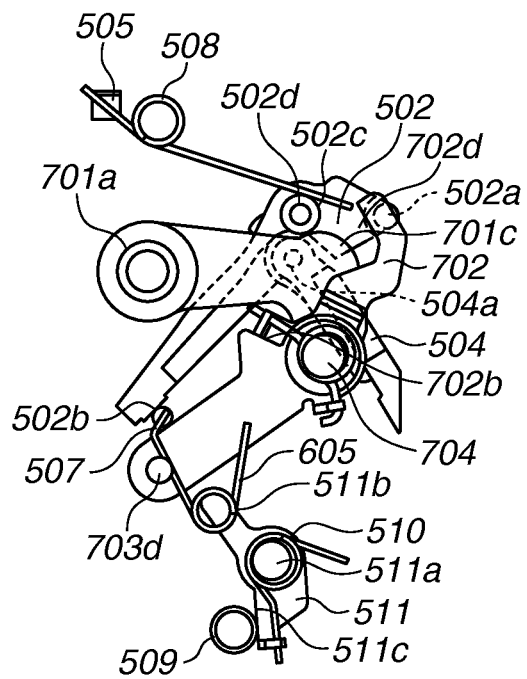
FIGS. 8A, 8B, 8C, and 8D are diagrams illustrating a state of various portions immediately after a start of a mirror up operation.
Figure 8B:
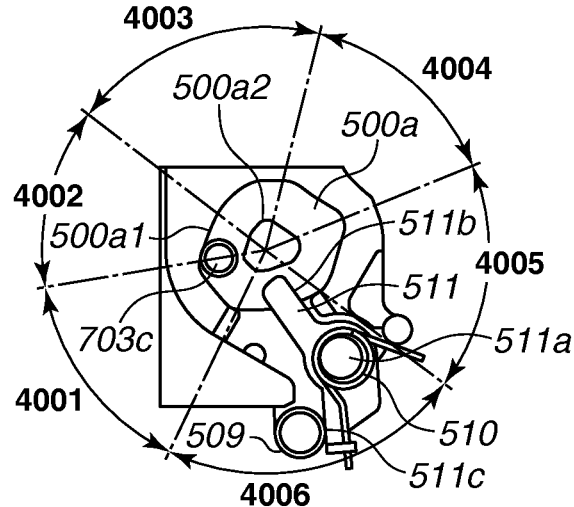
Figure 8C:
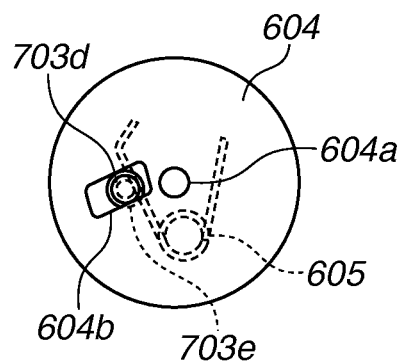
Figure 8D:
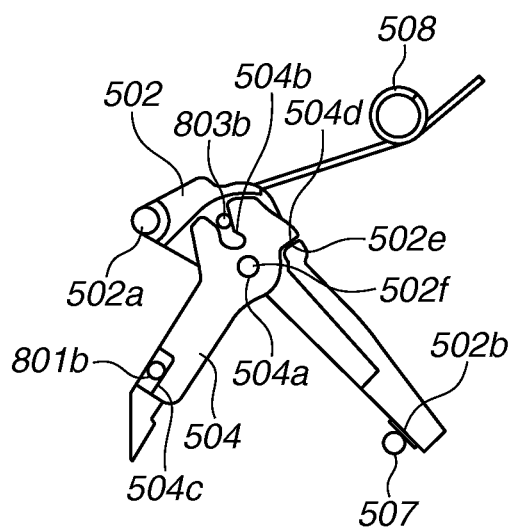

FIGS. 8A, 8B, 8C, and 8D are diagrams illustrating a state of various portions immediately after the start of the mirror up operation. FIG. 8A is a diagram illustrating a state of various parts arranged on the one side surface of the mirror box 500 immediately after the start of the mirror up operation. FIG. 8A is a diagram corresponding to FIG. 7A. FIG. 8B is a diagram illustrating the following relationship between the groove cam portion 500a formed in the mirror box 500 and the follower portion 703c of the link lever 703 immediately after the start of the mirror up operation. FIG. 8C is a diagram illustrating the engagement relationship between the rotation plate 604 and the driving shaft portion 703d of the link lever 703 immediately after the start of the mirror up operation. FIG. 8D is a diagram illustrating a state of the main mirror holder 502 and the sub mirror holder 504 immediately after the start of the mirror up operation.

As illustrated in FIG. 8A, in such a state, the contact surface 502b of the main mirror holder 502 is brought into contact with the main mirror positioning shaft 507 by the force of the main mirror down spring 508 that biases the first shaft portion 502c of the main mirror holder 502. Between the states illustrated in FIGS. 7A and 8A, only the mirror driving lever unit 700 moves. Consequently, in the state illustrated in FIG. 8A, the mirror driving lever 701 has rotated slightly from the state of FIG. 7A, and the mirror driving cam 701c of the mirror driving lever 701 makes contact with the first shaft portion 502c. In the state illustrated in FIG. 8A, the mirror unit 400 and the deceleration lever 511 are in the same state as illustrated in FIG. 7A. Between the states illustrated in FIGS. 7A and 8A, the mirror down lever 702 moves integrally with the link lever 703.

As illustrated in FIG. 8B, in such a state, the follower portion 703c of the link lever 703 moves from the section 4001 to the section 4002. In the section 4002, the motor 601 is controlled to accelerate. FIG. 8C illustrates the rotational phase of the rotation plate 604 obtained at this time. Since the driving shaft portion 703d of the link lever 703 is biased outward by the biasing force of the rotation spring 605, the follower portion 703c of the link lever 703 follows with the outer cam surface 500a1 of the groove cam portion 500a. If the follower portion 703c moves from the section 4001 to the section 4002 while following with the outer cam surface 500a1 of the groove cam portion 500a, the link lever 703 pushes up the mirror driving lever 701. Pushing up the mirror driving lever 701 brings the mirror driving cam 701c of the mirror driving lever 701 into contact with the first shaft portion 502c as illustrated in FIG. 8A. If the mirror driving cam 701c of the mirror driving lever 701 makes contact with the first shaft portion 502c, the section 4001 switches to the section 4002 and the motor 601 is gradually accelerated. In the section 4002, a cam surface shape of the outer cam surface 500a1 is formed so as to increase the amount of rotation of the mirror driving lever 701. Consequently, there are provided an acceleration effect by the acceleration control of the motor 601 and an acceleration effect by the cam surface shape of the outer cam surface 500a1.

Immediately after the start of the mirror up operation, the mirror unit 400 is in the same state as illustrated in FIG. 7A. As illustrated in FIG. 8D, in such a state, the contact surface 502b of the main mirror holder 502 is in contact with the main mirror positioning shaft 507. The contact surface 504c of the sub mirror holder 504 is in contact with the sub mirror positioning shaft 801b. Here, the contact portion 502e of the main mirror holder 502 and the contact portion 504d of the sub mirror holder 504 are not in contact with each other. There is a gap formed between the contact portions 502e and 504d.

If the mirror up operation of the mirror driving unit 1000 proceeds from the state illustrated in FIGS. 8A, 8B, 8C, and 8D, the state illustrated in FIGS. 9A, 9B, 9C, and 9D is caused.

Figure 9A:
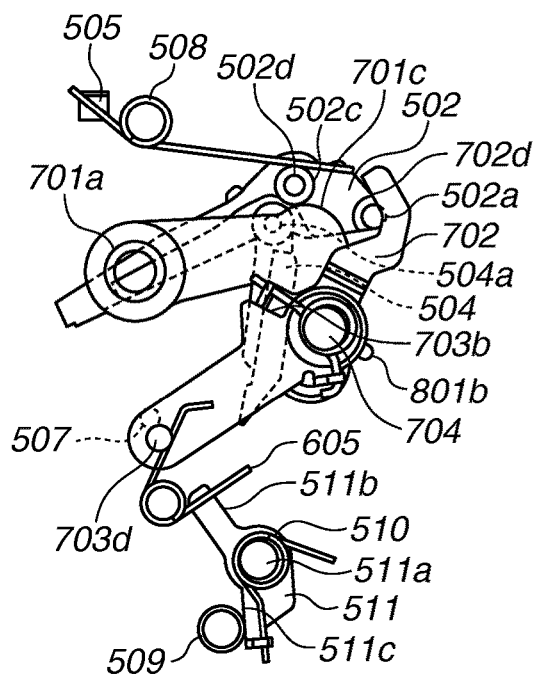
FIGS. 9A, 9B, 9C, and 9D are diagrams illustrating a state of various portions immediately before an end of the mirror up operation.
Figure 9B:
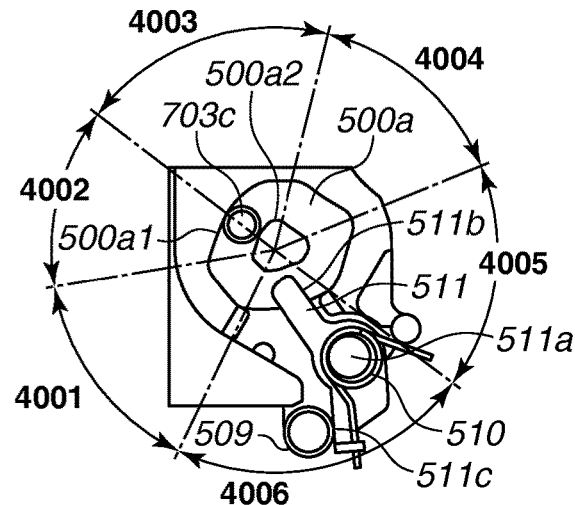
Figure 9C:
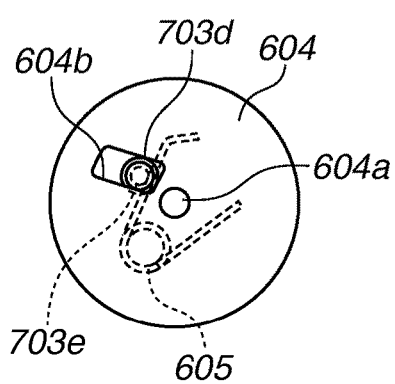
Figure 9D:
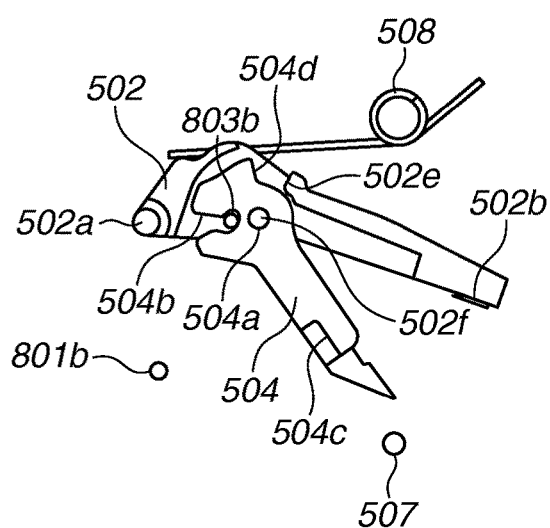

FIGS. 9A, 9B, 9C, and 9D are diagrams illustrating a state of various portions immediately before an end of the mirror up operation. FIG. 9A is a diagram illustrating a state of various parts arranged on the one side surface of the mirror box 500 immediately before the end of the mirror up operation. FIG. 9A is a diagram corresponding to FIG. 7A. FIG. 9B is a diagram illustrating the following relationship between the groove cam portion 500a formed in the mirror box 500 and the follower portion 703c of the link lever 703 immediately before the end of the mirror up operation. FIG. 9C is a diagram illustrating the engagement relationship between the rotation plate 604 and the driving shaft portion 703d of the link lever 703 immediately before the end of the mirror up operation. FIG. 9D is a diagram illustrating a state of the main mirror holder 502 and the sub mirror holder 504 immediately before the end of the mirror up operation.

As illustrated in FIG. 9A, in such a state, the mirror driving cam 701c of the mirror driving lever 701 pushes up the first shaft portion 502c against the biasing force of the main mirror down spring 508. Between the states illustrated in FIGS. 8A and 9A, the mirror unit 400 starts a mirror up operation. In the state illustrated in FIG. 9A, the deceleration lever 511 is in the same state as illustrated in FIG. 7A. Between the states illustrated in FIGS. 8A and 9A, the mirror down lever 702 moves integrally with the link lever 703.

As illustrated in FIG. 9B, in such a state, the follower portion 703c of the link lever 703 moves from the section 4002 to the section 4003. In the section 4003, the motor 601 starts to be controlled to decelerate. Here, as illustrated in FIG. 8C, the driving shaft portion 703d of the link lever 703 is biased outward by the biasing force of the rotation spring 605. The follower portion 703c of the link lever 703 thus follows with the outer cam surface 500a1 of the groove cam portion 500a. If the follower portion 703c moves from the section 4002 to the section 4003 while following with the outer cam surface 500a1 of the groove cam portion 500a, the link lever 703 further pushes up the mirror driving lever 701. After the section 4002 switches to the section 4003, the motor 601 is gradually decelerated. In the section 4003, the cam surface shape of the outer cam surface 500a1 is formed so as to reduce the amount of rotation of the mirror driving lever 701. Consequently, there are provided a braking effect by the deceleration control of the motor 601 and a braking effect by the cam surface shape of the outer cam surface 500a1.

As illustrated in FIG. 9D, the contact surface 502b of the main mirror holder 502 moves away from the main mirror positioning shaft 507 to perform the mirror up operation. The sub mirror driving shaft 803b of the sub mirror driving lever 803 follows with the driving cam 504b, so that the contact surface 504c of the sub mirror holder 504 moves away from the sub mirror positioning shaft 801b to perform the mirror up operation. The distance between the contact portions 502e and 504d increases as the mirror up operation proceeds.

If the mirror up operation of the mirror driving unit 1000 proceeds from the state illustrated in FIGS. 9A, 9B, 9C, and 9D, the state illustrated in FIGS. 10A, 10B, 10O, and 10D is caused.

Figure 10A:
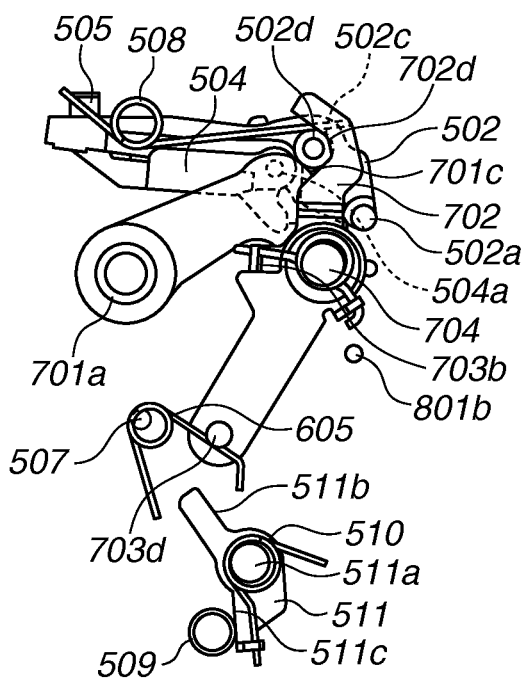
Figure 10B:
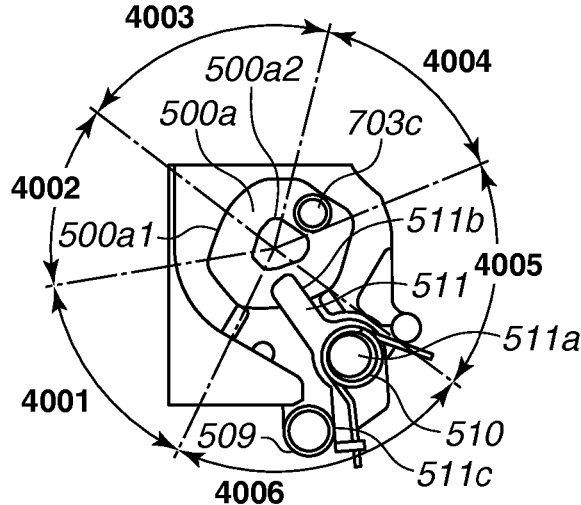
Figure 10C:
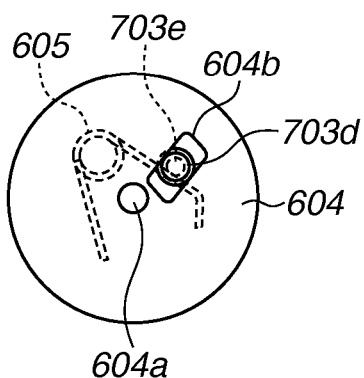
Figure 10D:
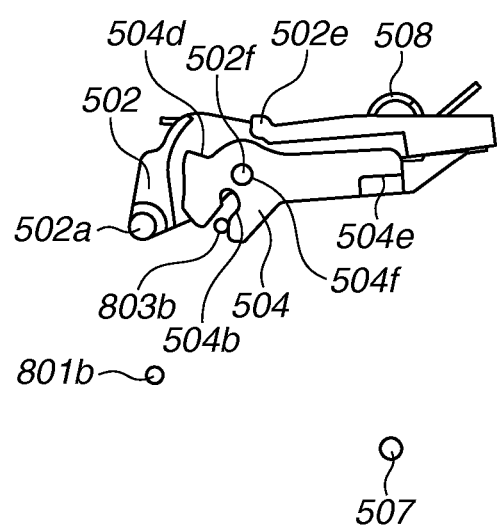

FIGS. 10A, 10B, 10O, and 10D are diagrams illustrating a state of various portions when the mirror unit 400 is at the mirror up position. FIG. 10A is a diagram illustrating the state of the various parts arranged on the one side surface of the mirror box 500 when the mirror unit 400 is at the mirror up position. FIG. 10A is a diagram corresponding to FIG. 7A. FIG. 10B is a diagram illustrating the following relationship between the groove cam portion 500a formed in the mirror box 500 and the follower portion 703c of the link lever 703 when the mirror unit 400 is at the mirror up position. FIG. 10O is a diagram illustrating the engagement relationship between the rotation plate 604 and the driving shaft portion 703d of the link lever 703 when the mirror unit 400 is at the mirror up position. FIG. 10D is a diagram illustrating the state of the main mirror holder 502 and the sub mirror holder 504 when the mirror unit 400 is at the mirror up position.

As illustrated in FIG. 10A, in such a state, the mirror driving cam 701c of the mirror driving lever 701 further pushes up the first shaft portion 502c against the biasing force of the main mirror down spring 508. The leading end of the main mirror holder 502 comes into contact with the mirror up stopper 505. The mirror up operation of the mirror unit 400 ends in the state illustrated in FIG. 10A. In the state illustrated in FIG. 10A, the deceleration lever 511 is in the same state as illustrated FIG. 7A. Between the states illustrated in FIGS. 9A and 10A, the mirror down lever 702 moves integrally with the link lever 703.

As illustrated in FIG. 10B, in such a state, the follower portion 703c of the link lever 703 is located in the section 4004. In the section 4004, the motor 601 is controlled to stop. As illustrated in FIG. 10O, the driving shaft portion 703d of the link lever 703 is biased outward by the biasing force of the rotation spring 605. When the mirror unit 400 is at the mirror up position, the direction in which the rotation spring 605 biases the driving shaft portion 703d of the link lever 703 is directly opposite to the direction in which the main mirror down spring 508 biases the first shaft portion 502c of the main mirror holder 502. The force of the rotation spring 605 that biases the driving shaft portion 703d of the link lever 703 is stronger than the force of the main mirror down spring 508 that biases the first shaft portion 502c of the main mirror holder 502. The mirror unit 400 is therefore maintained at the mirror up position. Meanwhile, the driving shaft portion 703d of the link lever 703 is pressed by the force of the main mirror down spring 508 that biases the first shaft portion 502c of the main mirror holder 502. Consequently, as illustrated in FIG. 10B, the follower portion 703c of the link lever 703 is not in contact with the outer cam surface 500a1 of the groove cam portion 500a. Here, the follower portion 703c of the link lever 703 is not in contact with the inner cam surface 500a2 of the groove cam portion 500a, either. In the section 4004, the follower portion 703c of the link lever 703 is not in contact with neither the outer cam surface 500a1 nor the inner cam surface 500a2 of the groove cam portion 500a. In the section 4004, the outer cam surface 500a1 and the inner cam surface 500a2 are formed so that the gap between the follower portion 703c and the outer cam surface 500a1 and the gap between the follower portion 703c and the inner cam surface 500a2 become substantially equal.

After the leading end of the main mirror holder 502 collides with the mirror up stopper 505, the mirror unit 400 bounces and the follower portion 703c makes contact with the inner cam surface 500a2 in the section 4004. In other words, the range where the mirror unit 400 can bounce at the mirror up position is limited to the range from the position where the follower portion 703c makes contact with the outer cam surface 500a1 and to the position where the follower portion 703c makes contact with the inner cam surface 500a2. In such a manner, the mirror driving unit 1000 according to the present exemplary embodiment limits the amount of bouncing of the mirror unit 400.

As illustrated in FIG. 10D, the sub mirror driving shaft 803b of the sub mirror driving lever 803 follows further with the driving cam 504b from the state of FIG. 9D, and the main mirror holder 502 and the sub mirror holder 504 enter a mirror up state.

If the motor 601 is started up in the state illustrated in FIGS. 10A, 10B, 10O, and 10D and the mirror driving unit 1000 starts the mirror down operation, the state illustrated in FIGS. 11A, 11B, 11C, and 11D is caused.

Figure 11A:
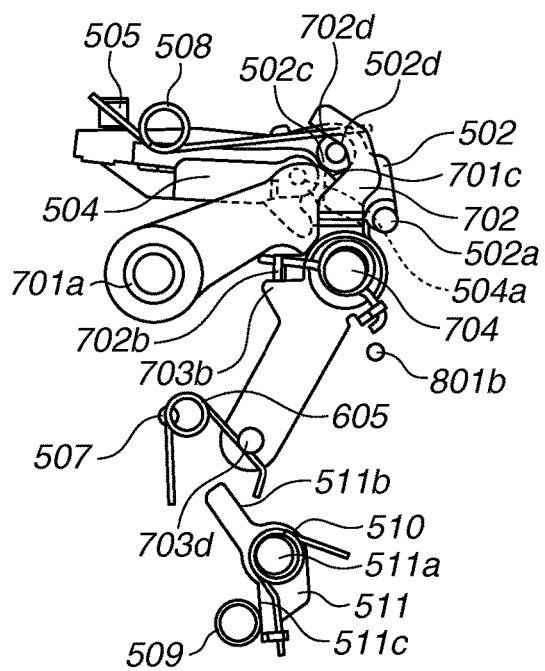
FIGS. 11A, 11B, 11C, and 11D are diagrams illustrating a state of various portions immediately after a start of a mirror down operation.
Figure 11B:
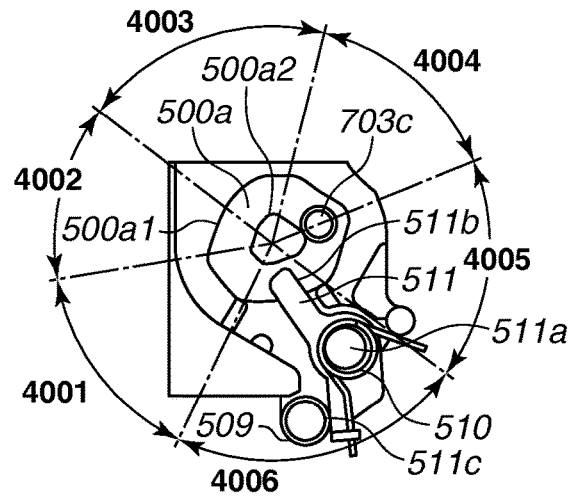
Figure 11C:
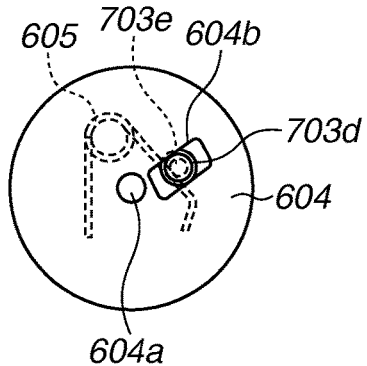
Figure 11D:
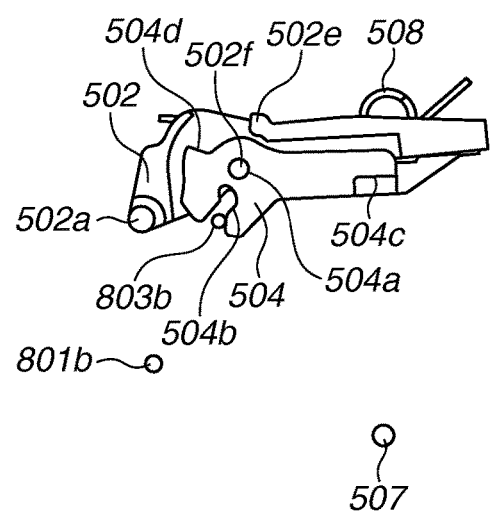

FIGS. 11A, 11B, 11C, and 11D are diagrams illustrating a state of various portions immediately after the start of the mirror down operation. FIG. 11A is a diagram illustrating the state of the various parts arranged on the one side surface of the mirror box 500 immediately after the start of the mirror down operation. FIG. 11A is a diagram corresponding to FIG. 7A. FIG. 11B is a diagram illustrating the following relationship between the groove cam portion 500a formed in the mirror box 500 and the follower portion 703c of the link lever 703 immediately after the start of the mirror down operation. FIG. 11C is a diagram illustrating the engagement relationship between the rotation plate 604 and the driving shaft portion 703d of the link lever 703 immediately after the start of the mirror down operation. FIG. 11D is a diagram illustrating the state of the main mirror holder 502 and the sub mirror holder 504 immediately after the start of the mirror down operation.

As illustrated in FIG. 11A, in such a state, the link lever 703 has rotated slightly counterclockwise from the state illustrated in FIG. 10A. Between the states illustrated in FIGS. 10A and 11A, the mirror down lever 702 moves integrally with the link lever 703. As a result, the engagement cam portion 702d of the mirror down lever 702 comes into engagement with the second shaft portion 502d of the main mirror holder 502. In the state illustrated in FIG. 11A, the mirror driving lever 701 rotates slightly from the state of FIG. 10A. Consequently, the main mirror holder 502 is pushed down by the force of the main mirror down spring 508 that biases the first shaft portion 502c of the main mirror holder 502. The leading end of the main mirror holder 502 thus moves away from the mirror up stopper 505.

As illustrated in FIG. 11B, in such a state, the follower portion 703c of the link lever 703 moves from the section 4004 to the section 4005. FIG. 11C illustrates the rotational phase of the rotation plate 604 obtained at this time. The driving shaft portion 703d of the link lever 703 is biased outward by the biasing force of the rotation spring 605, whereas the force for turning the driving shaft portion 703d outward is reduced due to the biasing force of the main mirror down spring 508. As a result, when the section 4004 switches to the section 4005, the follower portion 703c follows with the inner cam surface 500a2 of the groove cam portion 500a. If the entire follower portion 703c enters the section 4005, the relationship between the biasing direction of the driving shaft portion 703d by the rotation spring 605 and the biasing direction of the first shaft portion 502c by the biasing force of the main mirror down spring 508 changes. As a result, the force of the rotation spring 605 that biases the driving shaft portion 703d increases gradually, and the follower portion 703c no longer follows with the inner cam surface 500a2 but does over the outer cam surface 500a1. In the section 4005, the cam surface shapes of the outer cam surface 500a1 and the inner cam surface 500a2 are formed to increase the amount of rotation of the mirror driving lever 701. If the follower portion 703c follows with the outer cam surface 500a1 or the inner cam surface 500a2, the link lever 703 pushes down the mirror driving lever 701.

In the section 4005, the motor 601 is controlled to accelerate. In the section 4005, the cam surface shapes of the outer cam surface 500a1 and the inner cam surface 500a2 are formed to increase the amount of rotation of the mirror driving lever 701. Consequently, there are provided an acceleration effect by the acceleration control of the motor 601 and an acceleration effect by the cam surface shape of the outer cam surface 500a1.

Since the motor 601 is controlled to accelerate in the section 4005, the main mirror holder 502 may fail to follow the movement of the mirror driving lever 701 if the mirror driving lever 701 moves at high speed. In view of this, according to the present exemplary embodiment, as illustrated in FIG. 11A, the engagement cam portion 702d of the mirror down lever 702 is engaged with the second shaft portion 502d of the main mirror holder 502 in such a state. In other words, the mirror down lever 702 is configured to pull in the second shaft portion 502d of the main mirror holder 502. This enables the main mirror holder 502 to follow the movement of the mirror driving lever 701 even if the mirror driving lever 701 is moved at high speed. That is, as illustrated in FIG. 11A, the main mirror holder 502 is pressed down by the biasing force of the main mirror down spring 508 and pulled down by the mirror down lever 702.

As illustrated in FIG. 11D, in such a state, the main mirror holder 502 and the sub mirror holder 504 are in almost the same state as that of FIG. 10D. However, the leading end of the main mirror holder 502 is not in contact with the mirror up stopper 505.

If the mirror down operation of the mirror driving unit 1000 proceeds from the state illustrated in FIGS. 11A, 11B, 11C, and 11D, the state illustrated in FIGS. 12A, 12B, 12C, and 12D is caused.

Figure 12A:
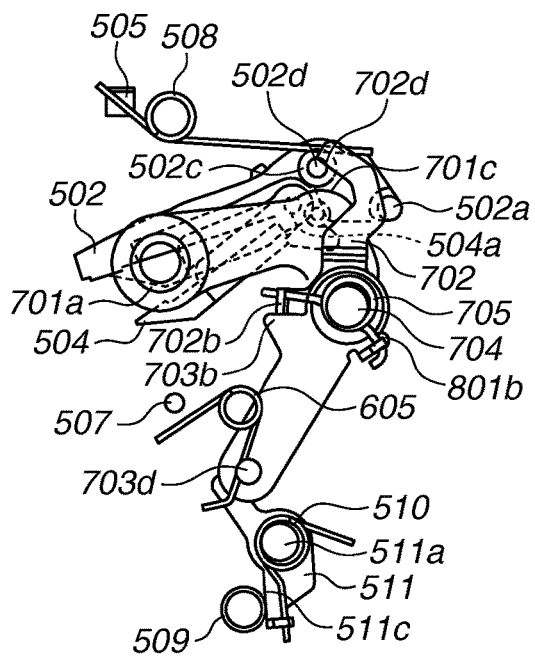
FIGS. 12A, 12B, 12C, and 12D are diagrams illustrating a state of various parts arranged on the one side surface of the mirror box during the mirror down operation.
Figure 12B:
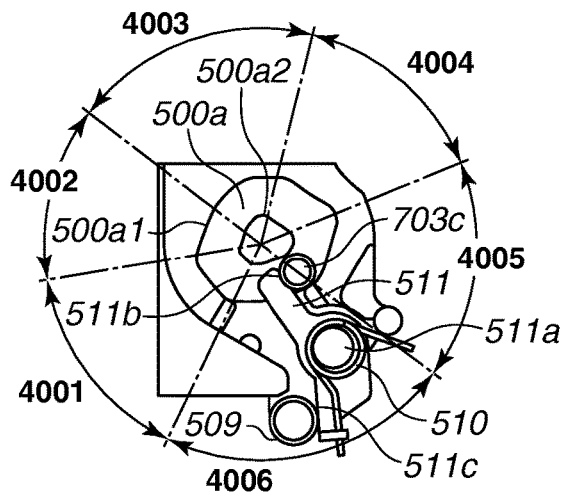
Figure 12C:
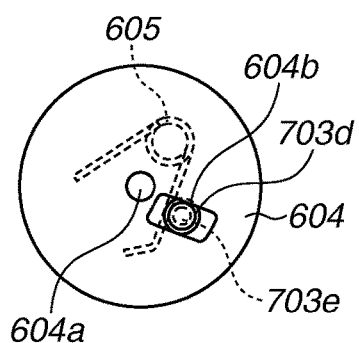
Figure 12D:
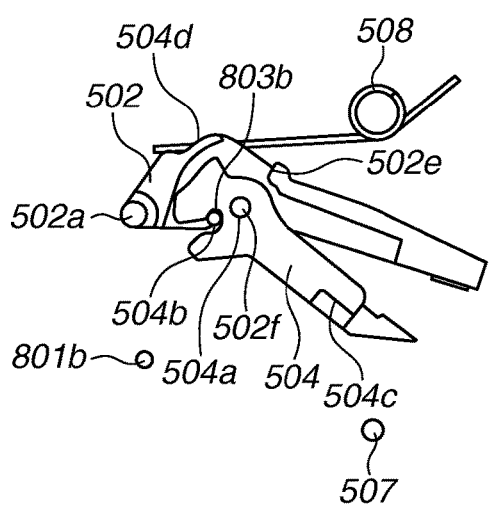

FIGS. 12A, 12B, 12C, and 12D are diagrams illustrating a state of various portions during the mirror down operation. FIG. 12A is a diagram illustrating the state of the various parts arranged on the one side surface of the mirror box 500 during the mirror down operation. FIG. 12A is a diagram corresponding to FIG. 7A. FIG. 12B is a diagram illustrating the following relationship between the groove cam portion 500a formed in the mirror box 500 and the follower portion 703c of the link lever 703 during the mirror down operation. FIG. 12C is a diagram illustrating the engagement relationship between the rotation plate 604 and the driving shaft portion 703d of the link lever 703 during the mirror down operation. FIG. 12D is a diagram illustrating the state of the main mirror holder 502 and the sub mirror holder 504 during the mirror down operation.

As illustrated in FIG. 12A, in such a state, the engagement cam portion 702d of the mirror down lever 702 is engaged with the second shaft portion 502d of the main mirror holder 502. In addition, the link lever 703 has rotated slightly with respect to the mirror down lever 702 against the biasing force of the mirror down lever return spring 705. Consequently, the contact portion 702b of the mirror down lever 702 and the contact portion 703b of the link lever 703 are not in contact with each other. In such a state, the main mirror holder 502 is pushed down by the biasing force of the main mirror down spring 508 and pulled down by the mirror down lever 702.

As illustrated in FIG. 12B, in such a state, the follower portion 703c of the link lever 703 moves from the section 4005 to the section 4006. In the section 4006, the motor 601 starts to be controlled to decelerate. Between the states illustrated in FIGS. 11B and 12B, if the entire follower portion 703c enters the section 4005, the follower portion 703c follows with the outer cam surface 500a1. As illustrated in FIG. 12A, in such a state, the biasing force of the main mirror down spring 508 does not act in a direction of reducing the biasing force of the rotation spring 605. As illustrated in FIG. 12C, the driving shaft portion 703d of the link lever 703 is biased outward by the biasing force of the rotation spring 605. The follower portion 703c of the link lever 703 therefore follows with the outer cam surface 500a1 of the groove cam portion 500a. Consequently, as illustrated in FIG. 12B, if the follower portion 703c enters the section 4006, the follower portion 703c comes into contact with the contact portion 511b of the deceleration lever 511. This instantaneously increases the load on the link lever 703, and the link lever 703 rotates slightly with respect to the mirror down lever 702 against the biasing force of the mirror down lever return spring 705. The contact of the follower portion 703c with the contact portion 511b brakes the link lever 703.

As illustrated in FIG. 12D, the sub mirror driving shaft 803b of the sub mirror driving lever 803 follows further with the driving cam 504b from the state of FIG. 11D, and the main mirror holder 502 and the sub mirror holder 504 are performing a mirror down operation.

If the mirror down operation of the mirror driving unit 1000 proceeds from the state illustrated in FIGS. 12A, 12B, 12C, and 12D, the state illustrated in FIGS. 13A, 13B, 13C, and 13D is caused.

Figure 13A:
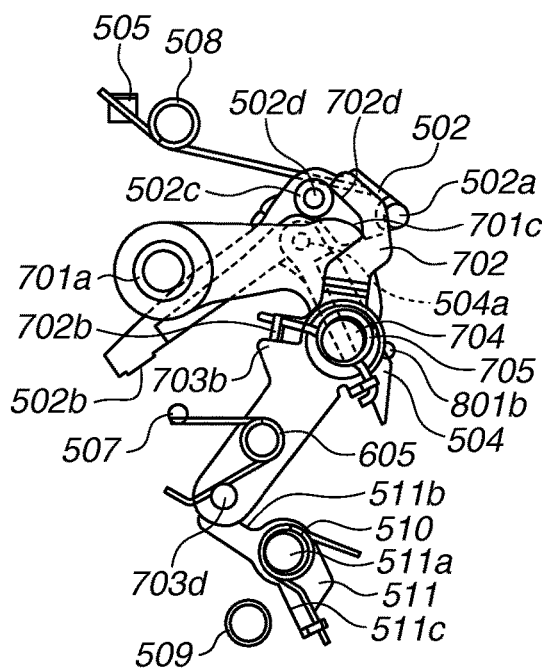
FIGS. 13A, 13B, 13C, and 13D are diagrams illustrating a state of various portions immediately before an end of the mirror down operation.
Figure 13B:
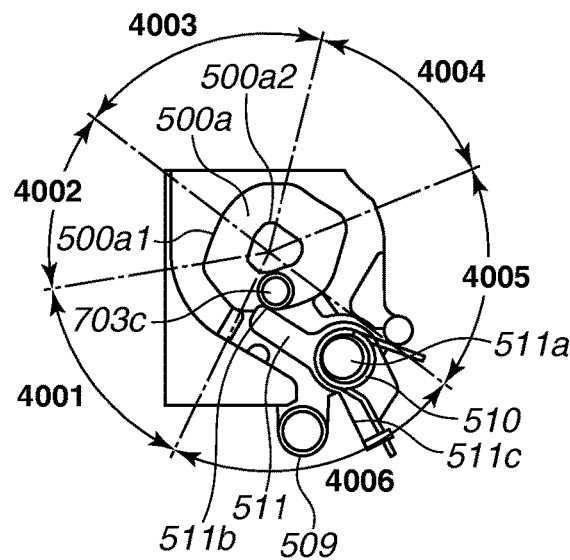
Figure 13C:
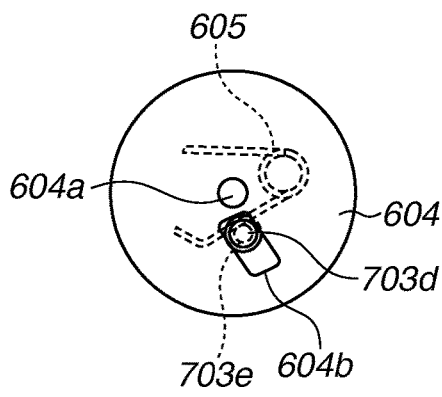
Figure 13D:
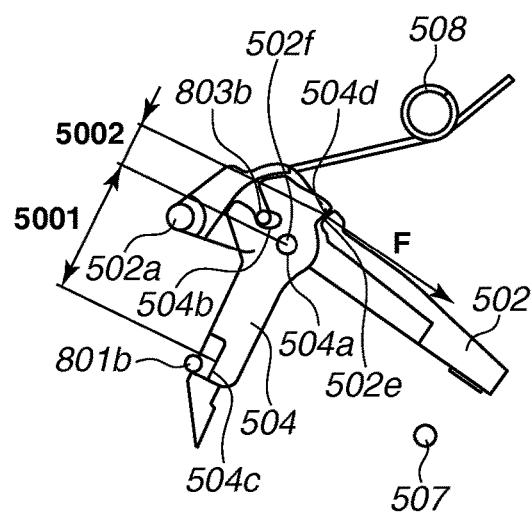

FIGS. 13A, 13B, 13C, and 13D are diagrams illustrating a state of various portions immediately before an end of the mirror down operation. FIG. 13A is a diagram illustrating the state of the various parts arranged on the one side surface of the mirror box 500 immediately before the end of the mirror down operation. FIG. 13A is a diagram corresponding to FIG. 7A. FIG. 13B is a diagram illustrating the following relationship between the groove cam portion 500a formed in the mirror box 500 and the follower portion 703c of the link lever 703 immediately before the end of the mirror down operation. FIG. 13C is a diagram illustrating the engagement relationship between the rotation plate 604 and the driving shaft portion 703d of the link lever 703 immediately before the end of the mirror down operation. FIG. 13D is a diagram illustrating the state of the main mirror holder 502 and the sub mirror holder 504 immediately before the end of the mirror down operation.

As illustrated in FIG. 13A, in such a state, the engagement cam portion 702d of the mirror down lever 702 and the second shaft portion 502d of the main mirror holder 502 are disengaged. The deceleration lever 511 rotates counterclockwise against the biasing force of the deceleration lever return spring 510. In such a state, the contact portion 702b of the mirror down lever 702 and the contact portion 703b of the link lever 703 are brought into contact with each other by the biasing force of the mirror down lever return spring 705.

As illustrated in FIG. 13B, in such a state, the entire follower portion 703c of the link lever 703 is in the section 4006. Between the states illustrated in FIGS. 12B and 13B, the follower portion 703c comes into contact with the contact portion 511b of the deceleration lever 511 to rotate the deceleration lever 511 counterclockwise against the biasing force of the deceleration lever return spring 510. In other words, the contact of the follower portion 703c with the contact portion 511b of the deceleration lever 511 shifts the contact portion 511b of the deceleration lever 511 from the entry state of entering the movement trajectory of the follower portion 703c to the retracted stated of being retracted from the movement trajectory of the follower portion 703c.

If the follower portion 703c rotates the deceleration lever 511, the instantaneous change in the load on the link lever 703 is cancelled out. Consequently, as illustrated in FIG. 13A, the contact portion 702b of the mirror down lever 702 and the contact portion 703b of the link lever 703 are brought into contact with each other by the biasing force of the mirror down lever return spring 705. As illustrated in FIG. 13C, the driving shaft portion 703d of the link lever 703 is biased outward by the biasing force of the rotation spring 605. When the follower portion 703c rotates the deceleration lever 511, the biasing force of the deceleration lever return spring 510 acts in a direction of reducing the biasing force of the rotation spring 605, whereas the biasing force of the rotation spring 605 is stronger. As a result, the follower portion 703c follows with the outer cam surface 500a1.

In the section 4006, the cam surface shape of the outer cam surface 500a1 is formed to reduce the amount of rotation of the mirror driving lever 701. Consequently, there are provided a braking effect by the deceleration control of the motor 601, a braking effect by the cam surface shape of the outer cam surface 500a1, and a braking effect by the rotation of the deceleration lever 511 by the follower portion 703c.

As illustrated in FIG. 13D, the sub mirror driving shaft 803b of the sub mirror driving lever 803 follows further with the driving cam 504b from the state of FIG. 12D. Here, the driving cam 504b is formed so that the open angle between the main mirror holder 502 and the sub mirror holder 504 becomes greater from the state of FIG. 12D through the state of FIG. 13D. As a result, the contact portion 502e of the main mirror holder 502 and the contact portion 504d of the sub mirror holder 504 make contact with each other. The contact between the contact portions 502e and 504d also brakes the sub mirror holder 504.

In general, if the mirror driving lever unit 700 is configured to drive the main mirror holder 502, the deceleration operation of the mirror driving lever unit 700 has an effect only on the main mirror holder 502. In the mirror driving unit 1000 according to the present exemplary embodiment, the main mirror holder 502 and the sub mirror holder 504 are brought into contact and integrated with each other when the main mirror holder 502 is decelerated. As a result, the deceleration operation of the mirror driving lever unit 700 acts on the integrated body of the main mirror holder 502 and the sub mirror holder 504. In other words, the sub mirror holder 504 can also be braked.

In the present exemplary embodiment, the contact portion 504d is formed so that the contact portion 504d and the contact surface 504c of the sub mirror holder 504 are located on opposite sides to each other across the hole portion 504a of the sub mirror holder 504. In such a manner, the contact portion 504d and the contact surface 504c can be located at a distance from each other. Even if the contact portion 504d is deformed, the contact surface 504c is less likely to be affected. In addition, the contact portion 504d is formed so that a distance 5002 from the contact portion 504d to the hole portion 504a is smaller than a distance 5001 from the hole portion 504a to the contact surface 504c. In other words, the contact portion 504d is located closer to the hole portion 504a serving as the rotation center of the sub mirror holder 504, whereby high inertial impact force is prevented. Moreover, the contact portions 502e and 504d are formed so that an impact caused by the contact between the contact portions 502e and 504d acts in a direction parallel to the surface of the main mirror holder 502 (the direction indicated by an arrow F).

If the mirror down operation of the mirror driving unit 1000 proceeds from the state illustrated in FIGS. 13A, 13B, 13C, and 13D, the state illustrated in FIGS. 7A, 7B, 7C, and 7D is caused. As described above, in FIGS. 7A, 7B, 7C, and 7D, the mirror unit 400 is at the mirror down position.

As illustrated in FIG. 7A, in such a state, the contact surface 502b of the main mirror holder 502 is in contact with the main mirror positioning shaft 507. The contact portion 511c of the deceleration lever 511 is brought into contact with the deceleration lever stopper 509 by the biasing force of the deceleration lever return spring 510.

As illustrated in FIG. 7B, if the follower portion 703c is located in the section 4001, the deceleration lever 511 is rotated clockwise by the biasing force of the deceleration lever return spring 510 until the contact portion 511c makes contact with the deceleration lever stopper 509. When the follower portion 703c is in the section 4001, the deceleration lever 511 blocks movement of the follower portion 703c even if the mirror driving unit 1000 is subjected to an impact or the like and the follower portion 703c attempts to move from the section 4001 to the section 4006. In other words, the deceleration lever 511 also functions as a regulating member for regulating the movement of the follower portion 703c in a direction opposite to the direction indicated by the arrows R (see FIG. 5B) in the section 4001.

As illustrated in FIG. 7D, in such a state, the contact portion 502e of the main mirror holder 502 and the contact portion 504d of the sub mirror holder 504 are not in contact with each other. There is a gap between the contact portions 502e and 504d.

If the contact surface 502b of the main mirror holder 502 comes into contact with the main mirror positioning shaft 507 and the contact surface 504c of the sub mirror holder 504 comes into contact with the sub mirror positioning shaft 801b, the mirror unit 400 bounces. Here, the mirror driving cam 701c of the mirror driving lever 701 is not in contact with the first shaft portion 502c, and only the mirror unit 400 bounces. The bouncing of the mirror unit 400 can be attenuated in a short time because the main mirror holder 502 and the sub mirror holder 504 are sufficiently decelerated before the mirror unit 400 reaches the mirror down position.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application 2014-169731, filed Aug. 22, 2014, and No. 2014-169732, filed Aug. 22, 2014, all of which are hereby incorporated by reference herein in their entirety.

What is claimed is:

1. A mirror driving device comprising:
a mirror;
a mirror box;
a mirror driving member rotatably attached to the mirror box and configured to drive the mirror between a first position where the mirror is located in an optical path and a second position where the mirror is retracted from the optical path;
a link member rotatably attached to the mirror driving member,
wherein a cam portion is formed in the mirror box,
wherein the link member includes a follower portion configured to follow with the cam portion,
wherein the cam portion is a groove cam portion having an inner cam surface and an outer cam surface,
wherein the follower portion does not follow with the outer cam surface in a case where the follower portion follows with the inner cam surface,
wherein the follower portion does not follow with the inner cam surface in a case where the follower portion follows with the outer cam surface,
wherein the follower portion follows with the outer cam surface in a case where the mirror moves from the first position to the second position,
wherein the follower portion makes contact with neither the inner cam surface nor the outer cam surface in a case where the mirror stops at the second position,
wherein the follower portion follows with the outer cam surface in a case where the mirror moves from the second position to the first position,
wherein the follower portion makes contact with the outer cam surface in a case where the mirror stops at the first position;
a rotation member engaged with the link member and configured to be driven to rotate by a driving source; and
a biasing member attached to the rotation member and configured to bias the follower portion toward the outer cam surface.

2. The mirror driving device according to claim 1, wherein the follower portion makes contact with the inner cam surface in a case where the mirror bounces.

3. The mirror driving device according to claim 1, further comprising a deceleration member attached to be shiftable between an entry state of entering a movement trajectory of the follower portion and a retracted state of being retracted from the movement trajectory of the follower portion,
wherein, in a case where the mirror moves from the second position to the first position, the follower portion makes contact with the deceleration member so as to shift the deceleration member from the entry state to the retracted state, and
wherein, in a case where the mirror stops at the first position, the deceleration member shifts from the retracted state to the entry state.

4. The mirror driving device according to claim 3, wherein, after the mirror moves up to the first position, the deceleration member does not shift from the entry state to the retracted state even if the follower portion makes contact with the deceleration member.

5. The mirror driving device according to claim 3, wherein the deceleration member is a deceleration lever rotatably attached to the mirror box, and
wherein the mirror driving device further comprises a spring configured to bias the deceleration lever so as to cause part of the deceleration lever to enter the movement trajectory of the follower portion.

6. An imaging apparatus comprising:
a mirror;
a mirror box;
a mirror driving member rotatably attached to the mirror box and configured to drive the mirror between a first position where the mirror is located in an optical path and a second position where the mirror is retracted from the optical path;
a link member rotatably attached to the mirror driving member,
wherein a cam portion is formed in the mirror box,
wherein the link member includes a follower portion configured to follow with the cam portion,
wherein the cam portion is a groove cam portion having an inner cam surface and an outer cam surface,
wherein the follower portion does not follow with the outer cam surface in a case where the follower portion follows with the inner cam surface,
wherein the follower portion does not follow with the inner cam surface in a case where the follower portion follows with the outer cam surface,
wherein the follower portion follows with the outer cam surface in a case where the mirror moves from the first position to the second position,
wherein the follower portion makes contact with neither the inner cam surface nor the outer cam surface in a case where the mirror stops at the second position,
wherein the follower portion follows with the outer cam surface in a case where the mirror moves from the second position to the first position,
wherein the follower portion makes contact with the outer cam surface in a case where the mirror stops at the first position;
a rotation member engaged with the link member and configured to be driven to rotate by a driving source; and
a biasing member attached to the rotation member and configured to bias the follower portion toward the outer cam surface.

* * * * *